(12) United States Patent
Bryant et al.

(10) Patent No.: US 11,447,851 B2
(45) Date of Patent: Sep. 20, 2022

(54) 6XXX ALUMINUM ALLOYS AND METHODS OF MAKING THE SAME

(71) Applicant: Arconic Inc., Pittsburgh, PA (US)

(72) Inventors: James Daniel Bryant, Murrysville, PA (US); Colleen E. Weller, Verona, PA (US); Dirk C. Mooy, Bettendorf, IA (US); Zachariah D. Meissen, Davenport, IA (US)

(73) Assignee: Arconic Technologies LLC, Pittsburgh, PA (US)

( * ) Notice: Subject to any disclaimer, the term of this patent is extended or adjusted under 35 U.S.C. 154(b) by 1042 days.

(21) Appl. No.: 15/165,595

(22) Filed: May 26, 2016

(65) Prior Publication Data

US 2016/0348225 A1 Dec. 1, 2016

Related U.S. Application Data

(60) Provisional application No. 62/168,194, filed on May 29, 2015.

(51) Int. Cl.
*C22F 1/057* (2006.01)
*C22C 21/18* (2006.01)
(Continued)

(52) U.S. Cl.
CPC ............ *C22F 1/057* (2013.01); *C22C 21/02* (2013.01); *C22C 21/08* (2013.01); *C22C 21/10* (2013.01);
(Continued)

(58) Field of Classification Search
None
See application file for complete search history.

(56) References Cited

U.S. PATENT DOCUMENTS 3,135,633 A * 6/1964 Hornus ............... C22F 1/05
148/695
5,718,780 A * 2/1998 Bryant ............... C21D 9/56
148/526
(Continued)

FOREIGN PATENT DOCUMENTS

EP 0480402 4/1992
EP 0616044 9/1994
(Continued)

OTHER PUBLICATIONS

A.S. Tenney, Temperature Control in Heat Treating, Heat Treating, vol. 4, ASM Handbook, ASM International, 1991, p. 529-541 (Year: 1991).*
(Continued)

*Primary Examiner* — Nicholas A Wang
(74) *Attorney, Agent, or Firm* — Greenberg Traurig, LLP (57) ABSTRACT

New 6xxx aluminum alloy sheet products and methods of making the same are disclosed. The new methods may include preparing a 6xxx aluminum alloy sheet product for solution heat treatment, solution heat treating and then quenching the 6xxx aluminum alloy sheet product, and then exposing the 6xxx aluminum alloy sheet product to a treatment temperature of from 30° C. to 60° C. for 0.2 to 300 seconds. After the exposing step, the 6xxx aluminum alloy sheet product may be coiled and then placed in an ambient environment. Due to the post-quench heating and subsequent exposure to ambient, a preselected amount of Newtonian cooling may be induced, thereby creating a unique and consistent microstructure within the 6xxx aluminum alloy sheet products.

18 Claims, 6 Drawing Sheets

(51) Int. Cl.
  C22C 21/16    (2006.01)
  C22C 21/14    (2006.01)
  C22C 21/10    (2006.01)
  C22C 21/08    (2006.01)
  C22C 21/02    (2006.01)
  C22F 1/053    (2006.01)
  C22F 1/047    (2006.01)
  C22F 1/043    (2006.01)

(52) U.S. Cl.
  CPC .............. *C22C 21/14* (2013.01); *C22C 21/16* (2013.01); *C22C 21/18* (2013.01); *C22F 1/043* (2013.01); *C22F 1/047* (2013.01); *C22F 1/053* (2013.01)

(56) References Cited

U.S. PATENT DOCUMENTS

| | | | | |
|---|---|---|---|---|
| 5,728,241 | A | 3/1998 | Gupta et al. | 148/694 |
| 7,029,543 | B2 | 4/2006 | Bull et al. | 148/552 |
| 8,328,963 | B2 | 12/2012 | Takaki et al. | 148/417 |
| 2003/0015261 | A1* | 1/2003 | Bull | C22C 21/02 148/551 |
| 2004/0094249 | A1* | 5/2004 | Uchida | C22C 21/02 148/693 |
| 2008/0175747 | A1* | 7/2008 | Kajihara | C22C 21/02 420/532 |

FOREIGN PATENT DOCUMENTS

| | | |
|---|---|---|
| EP | 0961841 | 5/2002 |
| EP | 0874917 | 5/2003 |
| JP | 02-209457 | 8/1990 |
| JP | H06-272002 | 9/1994 |
| JP | 2012041567 | * 3/2012 |

OTHER PUBLICATIONS

Vollmer, M. "Newton's law of cooling revisited." European Journal of Physics. 2009. 30. p. 1063-1084. (Year: 2009).*
1998. "Aluminum Wrought Products", Metals Handbook Desk Edition, Joseph R. Davis (Year: 1998).*
Jim Moran, 2003. "Effects of Metallurgical Variables on the Corrosion of Aluminum Alloys", Corrosion: Fundamentals, Testing, and Protection, Stephen D. Cramer, Bernard S. Covino, Jr. (Year: 2003).*
Masuda, T. et al., "Combined Effect of Pre-Straining and Pre-Aging on Bake-Hardening Behavior of an Al-0.6 mass%Mg-1.0 mass%Si Alloy", *Materials Transactions,* vol. 51, No. 2 (2010), pp. 325-332, The Japan Institute of Light Materials.
Miao, W. F., et al., "Effects of Cu Content and Preaging on Precipitation Characteristics in Aluminum Alloy 6022", *Metallurigical and Materials Transactions A*, vol. 31A, Feb. 2000, pp. 362-371.
Suzuki, H., et al., "A consideration on two-step aging in Al—Mg—Si alloy", Keikinzoku (Light Metals) vol. 30, No. 11, (1980) pp. 609-616, with English translation.
International Search Report and Written Opinion, dated Sep. 12, 2016, from corresponding International Patent Application No. PCT/US2016/034260.
Makoto Saga, et al., "Effect of pre-aging temperature on the behavior in the early stage of aging at high temperature for Al—Mg—Si alloy", *Materials Science Forum* vol. 217-22:821-826, (1996).
Supplemental European Search Report and Opinion, dated Dec. 21, 2018, from corresponding European Patent Application No. 16804052.5.

* cited by examiner

6XXX ALUMINUM ALLOYS AND METHODS OF MAKING THE SAME

CROSS-REFERENCE TO RELATED APPLICATION

This patent application claims benefit of priority of U.S. Provisional Patent Application No. 62/168,194, filed May 29, 2015, which is incorporated herein by reference in its entirety.

BACKGROUND

6xxx aluminum alloys are aluminum alloys having magnesium and silicon as the major alloying elements. 6xxx alloys may be strengthened due to precipitation of magnesium-silicon and/or magnesium-silicon-copper phases via appropriate tempering operations. However, improving one property of a 6xxx aluminum alloy without degrading another property often proves elusive. For example, it is difficult to increase the strength of a 6xxx alloy without decreasing its ductility. Other properties of interest for aluminum alloys include corrosion resistance and weldability, among others.

SUMMARY OF THE DISCLOSURE

Figure 1:
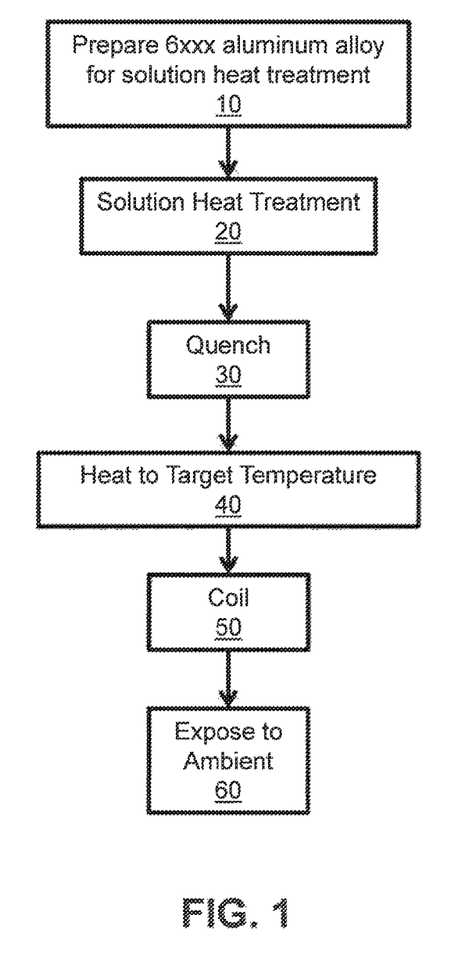
FIG. 1 is a flow chart illustrating one embodiment of a new method of preparing a coiled 6xxx aluminum alloy product.

Broadly the present patent application relates to new methods of producing 6xxx aluminum alloy sheet products. The new methods may result in products having more consistent properties. Referring now to FIG. 1, a method may include the steps of preparing (10) a 6xxx aluminum alloy sheet product for solution heat treating (20) and subsequent quenching (30). After the quenching (30), the method may include heating (40) the 6xxx aluminum alloy sheet product to a treatment temperature (e.g., from 30° C. to 60° C. for a period of 0.2 to 300 seconds), followed by coiling (50) of the 6xxx aluminum alloy sheet product. The coiled 6xxx aluminum alloy sheet product may then be exposed to ambient conditions (60). In one embodiment, at least the solution heat treating (20), quenching (30), heating (40) and coiling (50) steps take place continuously and in-line. Due to at least the heating step (40), the coiled 6xxx aluminum alloy sheet product may realize more consistent and improved strength properties. For instance, the 6xxx aluminum alloy sheet product may realize more consistent strength and ductility, facilitating consistent customer specification attainment and/or facilitating more consistent stamping and/or end strength attainment (e.g., for automotive manufacturers).

Still referring to FIG. 1, the preparing step (10) may include any suitable conventional operations to prepare the 6xxx aluminum alloy sheet product. For instance, and with reference now to FIGS. 1-3, the preparing step (10) may include casting (e.g., continuous casting, DC ingot casting) (step not illustrated), hot rolling (12), optional cold rolling (14), and with any number of suitable annealing steps (not illustrated) in between or subsequent to any of the hot rolling (12) and/or cold rolling (14) steps. The hot rolling (12) and any optional cold rolling (14) may be completed in any number of steps suitable to reach a final gauge product. After completion of the rolling, the 6xxx aluminum alloy sheet product may be at final gauge. A sheet product is defined by ANSI H35.2 as a product having a final gauge thickness of from 0.006 to 0.249 inch, and that definition applies to the new 6xxx aluminum alloy sheet product described herein. In one embodiment, the preparing step (10) includes continuously casting and then rolling the 6xxx aluminum alloy sheet product in-line, optionally with any appropriate annealing steps.

Figure 2:
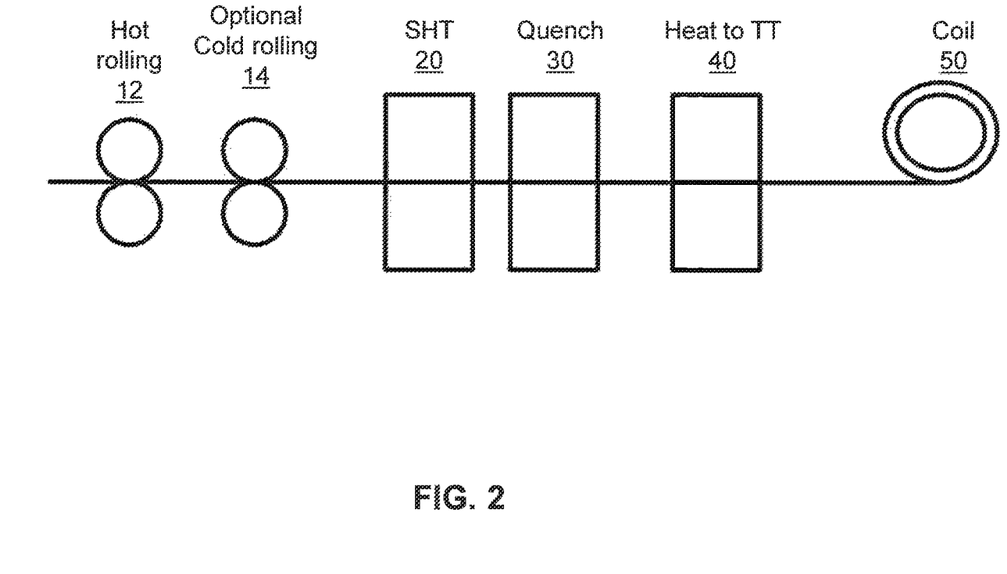
FIG. 2 is a schematic view of one embodiment of apparatus for achieving the method of FIG. 1.
Figure 3:
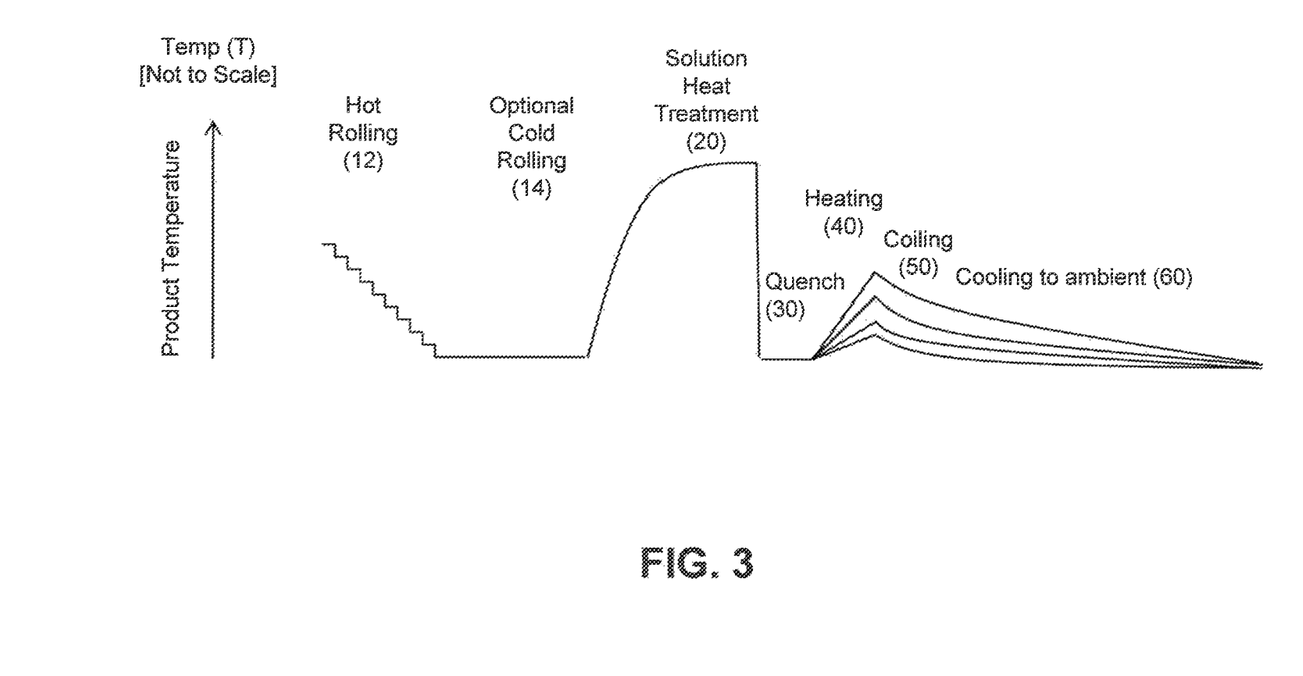
FIG. 3 is a graphical representation (not to scale) of the thermal exposure schedule of a 6xxx aluminum alloy product preparing in accordance with FIGS. 1-2.

Referring still to FIGS. 1-3, after the preparing step (10), the 6xxx aluminum alloy sheet product is solution heat treated (20) and then quenched (30). In one embodiment, the solution heat treatment (20) and quenching (30) steps are completed continuously and in-line with at least the hot rolling (12) and any optional cold rolling (14) steps. In one embodiment, the solution heat treatment (20) and quenching (30) are completed continuously and in-line with the casting, the hot rolling (12) and any optional cold rolling (14) steps.

The solution heating treating step (20) heats the 6xxx aluminum alloy sheet product to a temperature sufficiently high to solutionize the alloy (e.g., to place soluble particles in solid solution). The new 6xxx aluminum alloy sheet product is then immediately quenched (30), generally by contacting the 6xxx aluminum alloy sheet product with a liquid (e.g., water) and/or a gas (e.g., air). After the quenching step (30), the new 6xxx aluminum alloy sheet product is generally at ambient temperature.

After the quenching (30) the new 6xxx aluminum alloy sheet product is then heated (40) to a treatment temperature of from 30° C. to 60° C. and for a period of from 0.2 to 300 seconds. The heating step (40) occurs for a period sufficient such that the new 6xxx aluminum alloy sheet product achieves the treatment temperature. Upon achievement of the treatment temperature the new 6xxx aluminum alloy sheet product may be removed from the heating apparatus (e.g., an infrared or induction heating apparatus) and then coiled (60). In other words, the new 6xxx aluminum alloy sheet product is generally not appreciably held at the treatment temperature, which may result in isothermal treatment of the product. In this regard, the residence time of the new 6xxx aluminum alloy sheet product in the heating apparatus may be from 0.2 to 300 seconds. In one embodiment, the residence time of the new 6xxx aluminum alloy sheet product in the heating apparatus may be from 0.2 to 150 seconds. In another embodiment, the residence time of the new 6xxx aluminum alloy sheet product in the heating apparatus may be from 0.2 to 75 seconds. In yet another embodiment, the residence time of the new 6xxx aluminum alloy sheet product in the heating apparatus may be from 0.2 to 30 seconds. In another embodiment, the residence time of the new 6xxx aluminum alloy sheet product in the heating apparatus may be from 0.2 to 15 seconds. In yet another embodiment, the residence time of the new 6xxx aluminum alloy sheet product in the heating apparatus may be from 0.2 to 10 seconds. In another embodiment, the residence time of the new 6xxx aluminum alloy sheet product in the heating apparatus may be from 0.2 to 5 seconds. In yet another embodiment, the residence time of the new 6xxx aluminum alloy sheet product in the heating apparatus may be from 0.2 to 4 seconds. In another embodiment, the residence time of the new 6xxx aluminum alloy sheet product in the heating apparatus may be from 0.2 to 3 seconds. In yet another embodiment, the residence time of the new 6xxx aluminum alloy sheet product in the heating apparatus may be from 0.2 to 2 seconds. In one embodiment, the heating step (40) occurs continuously and in-line with at least the hot rolling (12), optional cold rolling (14), solution heat treating (20), and quenching steps (30), and optionally in-line with the initial casting of the aluminum alloy.

The treatment temperature of the heating step (40) is generally in the range of from 30° to 60° C. As shown by the data in the below examples, the heating step (40) may stabilize the product and provides for more consistent as-received properties for customers (e.g., for automotive manufacturers). In one embodiment, the treatment temperature of the heating step (40) is from 30° to 55° C. In another embodiment, the treatment temperature of the heating step (40) is from 30° to 50° C. In yet another embodiment, the treatment temperature of the heating step (40) is above 30° C. but below 50° C. In one embodiment, the new 6xxx aluminum alloy sheet product is an AA6111 aluminum alloy sheet product requiring an as-received tensile yield strength of at least 145 MPa thirty (30) days post-quench. In this embodiment, the treatment temperature of the heating step (40) may be from 30° C. to 45° C., for instance.

After the heating step (40), the new 6xxx aluminum alloy sheet product is generally coiled (50). The coiling (50) may include any conventional coiling operations including leveling of the product. After the coiling step (50), the new 6xxx aluminum alloy sheet product is generally placed in/exposed to an ambient environment (60). Due to the heating step (40), the coiled 6xxx aluminum alloy sheet product is generally hotter than ambient, and thus the coiled 6xxx aluminum alloy sheet product may naturally cool (Newtonian cooling) to ambient temperature over a period of time.

Figure 4:
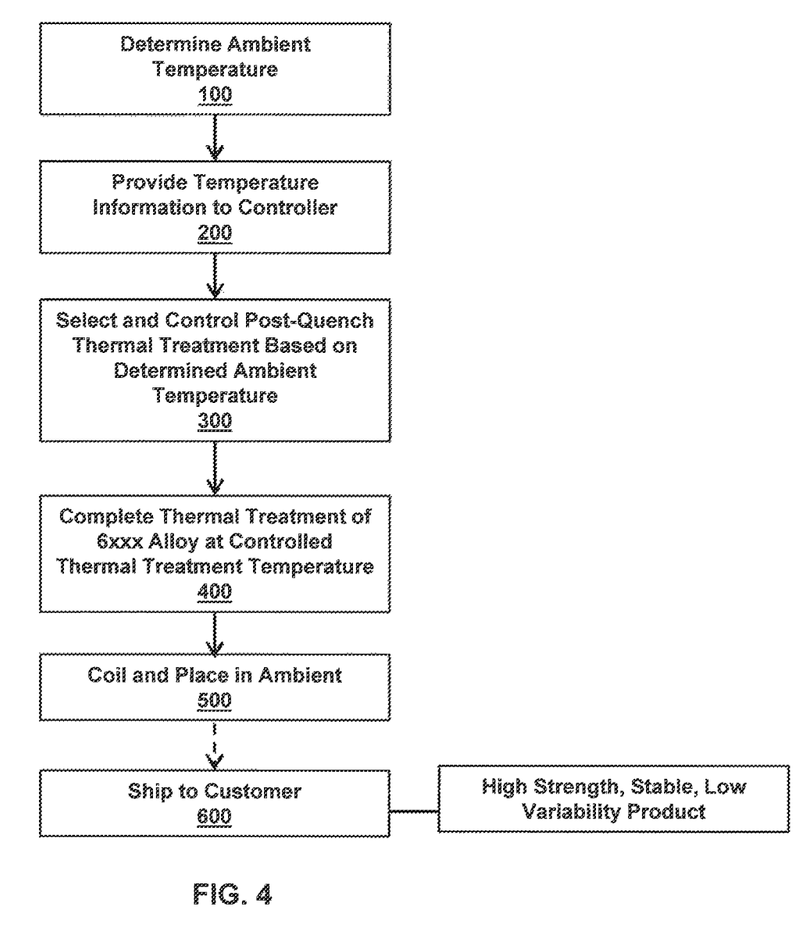
FIG. 4 is a flow chart illustrating one embodiment of a method of selecting the post-quench treatment temperature.

The combination of the heating (40) and the Newtonian cooling by exposure to ambient (60) may impart a unique and consistent microstructure to the new 6xxx aluminum alloy sheet product, thereby imparting consistent properties to the coiled 6xxx aluminum alloy sheet product. Indeed, for any given ambient environment, a Newtonian cooling curve may be derived relative to a predetermined coil size and/or coil target temperature. Thus, and referring now to FIGS. 1 and 4, a method may include determining the ambient temperature (100), such as the ambient temperature of a location where the coiled 6xxx aluminum alloy sheet product may be stored. This ambient temperature information may then be provided (200) to a controller associated with a post-quench heating apparatus of the heating step (40). The post-quench treatment temperature may thus be selected and controlled (300) based on the determined ambient temperature, and the heating step (40) may be completed (400) at the selected treatment temperature to provide the appropriate amount of Newtonian cooling to the coiled 6xxx aluminum alloy sheet product. The post-quench, thermally treated 6xxx aluminum alloy sheet product may then be coiled and placed in the ambient environment (500), where the coiled 6xxx aluminum alloy sheet product may achieve the selected amount of Newtonian cooling so as to achieve the unique and consistent microstructure. In some embodiments, prior to the heating step (400), a predetermined Newtonian cooling curve may be selected, and the treatment temperature of the heating step (40) may be selected based on the predetermined Newtonian cooling curve and the ambient temperature, thereby facilitating achievement of the selected amount of Newtonian cooling. The method may optionally include shipping the coiled product to a customer (600). The product as-received by the customer may thus consistently meet customer specifications due to the unique methods described herein.

Figure 5:
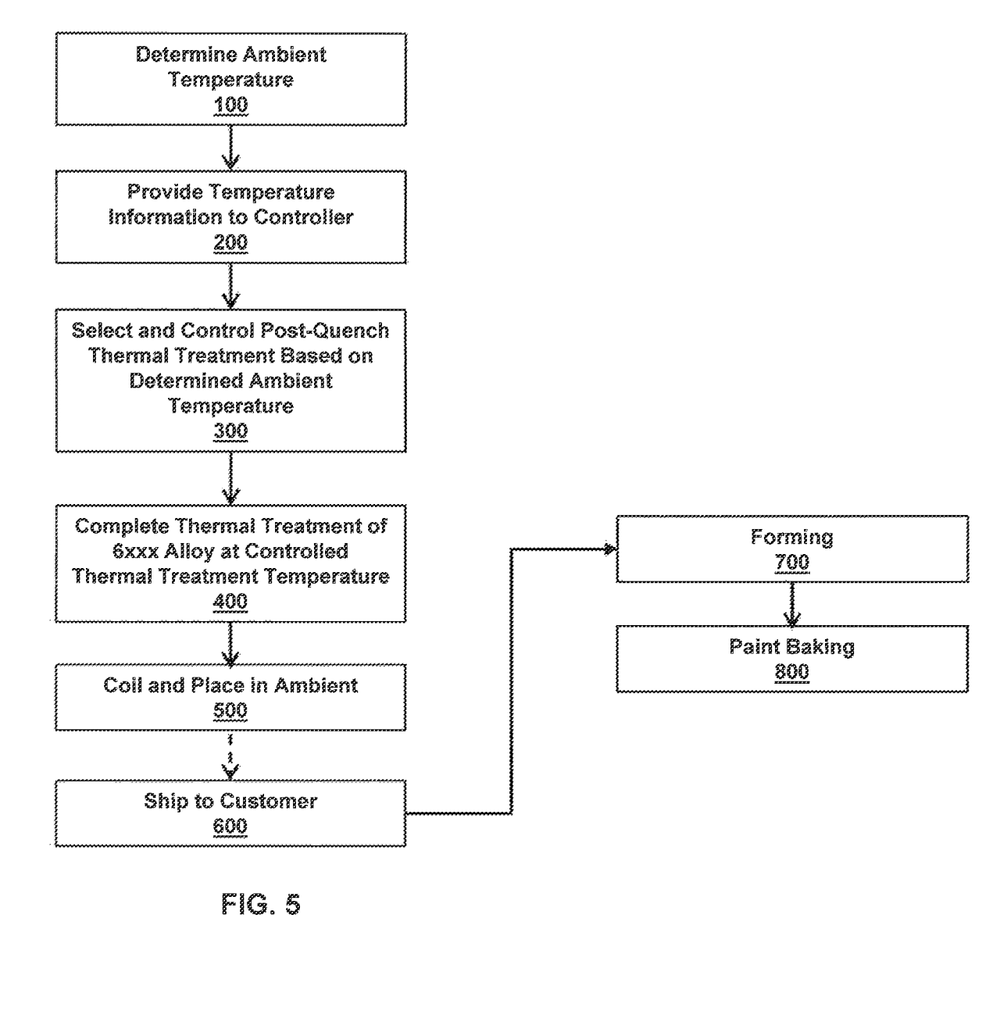
FIG. 5 is a flow chart illustrating additional embodiments of FIG. 4.

Indeed, and with reference now to FIG. 5, due to the unique methods described herein, the product as-received by the customer may consistently meet customer specifications, and the customer may be able to more readily and consistently form an end product (700) (e.g., stamping into an automotive component). After the forming (700) the end product may be painted and then baked (800) (e.g., at 180° C. for 20 minutes), which may act as an artificial aging treatment for the 6xxx aluminum alloy sheet product. The painted and baked end product may also thus realize consistent properties. The new methods described herein may be suitable for any industry, but are especially suitable to the automotive industry where consistent as-received properties may be required.

The new methods described herein may be applicable to any suitable 6xxx aluminum alloy. In one embodiment, the 6xxx aluminum alloy is an AA6111 aluminum alloy having 0.6-1.1 wt. % Si, 0.5-1.0 wt. % Mg, 0.50-0.9 wt. % Cu, 0.10-0.45 wt. % Mn, up to 0.40 wt. % Fe, up to 0.10 wt. % Cr, up to 0.15 wt. % Zn, up to 0.10 wt. % Ti, the balance being aluminum and unavoidable impurities.

In another embodiment the 6xxx aluminum alloy is an AA6022 aluminum alloy having 0.8-1.5 wt. % Si, 0.45-0.7 wt. % Mg, 0.01-0.11 wt. % Cu, 0.02-0.10 wt. % Mn, 0.05-0.20 wt. % Fe, up to 0.10 wt. % Cr, up to 0.25 wt. % Zn, up to 0.15 wt. % Ti, the balance being aluminum and unavoidable impurities.

In another embodiment the 6xxx aluminum alloy is an AA6016 aluminum alloy having 1.0-1.5 wt. % Si, 0.25-0.6 wt. % Mg, up to 0.20 wt. % Cu, up to 0.20 wt. % Mn, up to 0.50 wt. % Fe, up to 0.10 wt. % Cr, up to 0.20 wt. % Zn, up to 0.15 wt. % Ti, the balance being aluminum and unavoidable impurities.

In another embodiment the 6xxx aluminum alloy is an AA6014 aluminum alloy having 0.30-0.6 wt. % Si, 0.40-0.8 wt. % Mg, up to 0.25 wt. % Cu, 0.05-0.20 wt. % Mn, up to 0.35 wt. % Fe, up to 0.20 wt. % Cr, up to 0.10 wt. % Zn, 0.05-0.20 V, up to 0.10 wt. % Ti, the balance being aluminum and unavoidable impurities.

In another embodiment the 6xxx aluminum alloy is an AA6013 aluminum alloy having 0.6-1.0 wt. % Si, 0.8-1.2 wt. % Mg, 0.6-1.1 wt. % Cu, 0.20-0.8 wt. % Mn, up to 0.50 wt. % Fe, up to 0.10 wt. % Cr, up to 0.25 wt. % Zn, up to 0.10 wt. % Ti, the balance being aluminum and unavoidable impurities.

These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

DETAILED DESCRIPTION

The below examples at least partially assist in illustrating various pertinent aspects of the technology described herein.

Unless otherwise indicated, all mechanical properties (strength, elongation) were tested in accordance with ASTM E8 (Rev. 13a) and ASTM B557 (Rev. 14) and in the long-transverse (LT) direction. All reported values are the average of at least duplicate specimens, unless otherwise indicated. Tensile yield strength may be abbreviated "TYS" and is reported in MPa, unless otherwise indicated. Ultimate tensile strength may be abbreviated "UTS" and is reported in MPa, unless otherwise indicated. Elongation may be abbreviated "Elong." and is reported in percent (%), unless otherwise indicated. Natural aging may be abbreviated "NA". Simulated paint bake may be abbreviated PB. Post-quench may be labeled "PQ". Treatment temperature may be abbreviated "TT".

EXAMPLE 1

Isothermal Testing of 6111 Alloys

A 6111 alloy sheet product was prepared by hot rolling a 6111 aluminum alloy ingot to form an intermediate gauge product, and then cold rolling the product to a final gauge of about 2.7 mm. The final gauge product was then solution heat treated and quenched. Various pieces of the product were then brought to isothermal holding temperatures of 0, 10, 21 or 38° C. by placing the various pieces in an appropriate heating or cooling apparatus. The products were then held at the hold temperatures for about 4 days. Subsequently, the products were removed from the apparatus and allowed to reach ambient temperature (these products are called "0 days of natural aging" or "0-NA", below), after which the tensile yield strengths (TYS) were measured. Some of the products were then naturally aged at ambient temperature for 10 or 26 days, after which the TYS(LT) were measured (these products are called "10 days of natural aging" or "10-NA", and "26 days of natural aging," or and "26-NA", respectively, below). Next, some of the products were given a simulated paint bake (PB) cycle (180° C. for 20 minutes) after which the TYS(LT) were again measured. Table 1, below, contains the measured TYS(LT) values.

TABLE 1

Measured TYS(LT) values of T4 Example 1 Alloys (in MPa)

| Sample | 0° C. Hold Temp | 10° C. Hold Temp | 21° C. Hold Temp | 38° C. Hold Temp |
|---|---|---|---|---|
| Sample 1 (0-NA) | 94 | 113 | 124 | 128 |
| Sample 2 (10-NA) | 142 | 142 | 138 | 131 |
| Sample 3 (26-NA) | 147 | 147 | 141 | 132 |
| Max Variance | 54 | 34 | 17 | 3 |
| Sample 4 (0-NA + PB) | 146 | 141 | 143 | 155 |
| Sample 5 (10-NA + PB) | 141 | 140 | 145 | 156 |
| Sample 6 (26-NA + PB) | 139 | 140 | 145 | 156 |
| Max Variance | −7 | −1 | 2 | 1 |

As shown in Table 1, the TYS(LT) for the tested alloys prior to the paint bake cycle was most consistent (i.e., the maximum variance was small) for the alloys held at a hold temperature of 38° C. Table 1 also demonstrates that the absolute TYS(LT) values after PB were highest for the alloys held at a temperature of 38° C., as well as demonstrating the lowest variance. As demonstrated in Table 2, below, the paint bake response was also more consistent (i.e., the maximum variance was small) for the alloys held at the hold temperature of 38° C. The paint bake response is the difference in strength between the NA+PB and the NA samples). Additionally, the paint bake response at 10 days and 26 days of natural aging (after a four day hold at a temperature of 38° C.) were higher than any other hold temperature tested.

TABLE 2

Strength increase (in MPa) due to simulated paint baking for Example 1 alloys

| | 0° C. Hold Temp | 10° C. Hold Temp | 21° C. Hold Temp | 38° C. Hold Temp |
|---|---|---|---|---|
| Sample 4 − Sample 1 | 52 | 28 | 19 | 27 |
| Sample 5 − Sample 2 | −1 | −2 | 7 | 25 |
| Sample 6 − Sample 3 | −8 | −7 | 5 | 24 |
| Max Variance | 60 | 35 | 14 | 3 |

EXAMPLE 2

Non-Isothermal Testing of 6111 Alloys

A 6111 alloy sheet product was prepared by hot rolling a 6111 aluminum alloy ingot to form an intermediate gauge product, and then cold rolling the product to a final gauge of about 2.7 mm. The final gauge product was then solution heat treated and quenched. Various pieces of the product were then placed in a heating apparatus and heated to treatment temperatures (TT) of 27, 32, 38, 43 and 49° C. Some pieces were also left at ambient (about 23° C.) as a control. After reaching their treatment temperature, the heated products were then controllably cooled to ambient temperature (about 23° C.) over a period of 48 hours to simulate Newtonian cooling of an industrial size coil of 6111 sheet. Mechanical properties of the samples were then measured for various times, as measured post-quench (referred to as "x day PQ", below). Mechanical properties were tested in accordance with ASTM B557. Tables 3-5, below, contain the measured properties.

TABLE 3

Tensile yield strengths of Newtonian cooled Example 2 samples

| Post-Quench Exposure (° C.) | Newtonian Cooling Time to 23° C. (hrs) | Tensile Yield Strength | | | | | Variance | | | |
| | | 4 days PQ | 14 days PQ | 30 days PQ | 90 days PQ | 180 days PQ | 4 to 14 days | 4 to 30 days | 4 to 90 days | 4 to 180 days |
|---|---|---|---|---|---|---|---|---|---|---|
| Ambient (≈23° C.) | 48 | 132 | 144 | 149 | 152 | 155 | 12 | 17 | 20 | 23 |

TABLE 3-continued

Tensile yield strengths of Newtonian cooled Example 2 samples

| Post-Quench Exposure (° C.) | Newtonian Cooling Time to 23° C. (hrs) | Tensile Yield Strength | | | | | Variance | | | |
|---|---|---|---|---|---|---|---|---|---|---|
| | | 4 days PQ | 14 days PQ | 30 days PQ | 90 days PQ | 180 days PQ | 4 to 14 days | 4 to 30 days | 4 to 90 days | 4 to 180 days |
| 27 | 48 | 130 | 138 | 143 | 146 | 151 | 8 | 13 | 16 | 21 |
| 32 | 48 | 129 | 138 | 142 | 146 | 151 | 9 | 13 | 17 | 22 |
| 38 | 48 | 126 | 134 | 137 | 142 | 146 | 8 | 11 | 18 | 20 |
| 43 | 48 | 122 | 128 | 133 | 137 | 142 | 6 | 11 | 15 | 20 |
| 49 | 48 | 121 | 127 | 131 | 134 | 139 | 6 | 10 | 13 | 18 |

TABLE 4

Ultimate tensile strengths of Newtonian cooled Example 2 samples

| Post-Quench Exposure (° C.) | Newtonian Cooling Time to 23° C. (hrs) | Ultimate Tensile Strength | | | | | Variance | | | |
|---|---|---|---|---|---|---|---|---|---|---|
| | | 4 days PQ | 14 days PQ | 30 days PQ | 90 days PQ | 180 days PQ | 4 to 14 days | 4 to 30 days | 4 to 90 days | 4 to 180 days |
| Ambient (≈23° C.) | 48 | 272 | 283 | 288 | 293 | 296 | 11 | 16 | 21 | 24 |
| 27 | 48 | 269 | 278 | 282 | 287 | 292 | 9 | 13 | 18 | 23 |
| 32 | 48 | 269 | 278 | 282 | 287 | 292 | 9 | 13 | 18 | 23 |
| 38 | 48 | 265 | 273 | 276 | 282 | 288 | 8 | 11 | 17 | 23 |
| 43 | 48 | 263 | 268 | 272 | 278 | 283 | 5 | 9 | 15 | 20 |
| 49 | 48 | 262 | 266 | 269 | 273 | 278 | 4 | 7 | 11 | 16 |

TABLE 5

Elongation of Newtonian cooled Example 2 samples

| Post-Quench Exposure (° C.) | Newtonian Cooling Time to 23° C. (hrs) | Elongation (%) | | | | | Variance | | | |
|---|---|---|---|---|---|---|---|---|---|---|
| | | 4 days PQ | 14 days PQ | 30 days PQ | 90 days PQ | 180 days PQ | 4 to 14 days | 4 to 30 days | 4 to 90 days | 4 to 180 days |
| Ambient (≈23° C.) | 48 | 27 | 27 | 28 | 27 | 29 | 0 | 1 | 0 | 2 |
| 27 | 48 | 27 | 28 | 27 | 28 | 28 | 1 | 0 | 1 | 1 |
| 32 | 48 | 27 | 28 | 28 | 28 | 28 | 1 | 1 | 1 | 1 |
| 38 | 48 | 27 | 27 | 28 | 28 | 28 | 0 | 1 | 1 | 1 |
| 43 | 48 | 27 | 27 | 28 | 28 | 29 | 0 | 1 | 1 | 2 |
| 49 | 48 | 28 | 28 | 28 | 28 | 27 | 0 | 0 | 0 | 1 |

Figure 6:
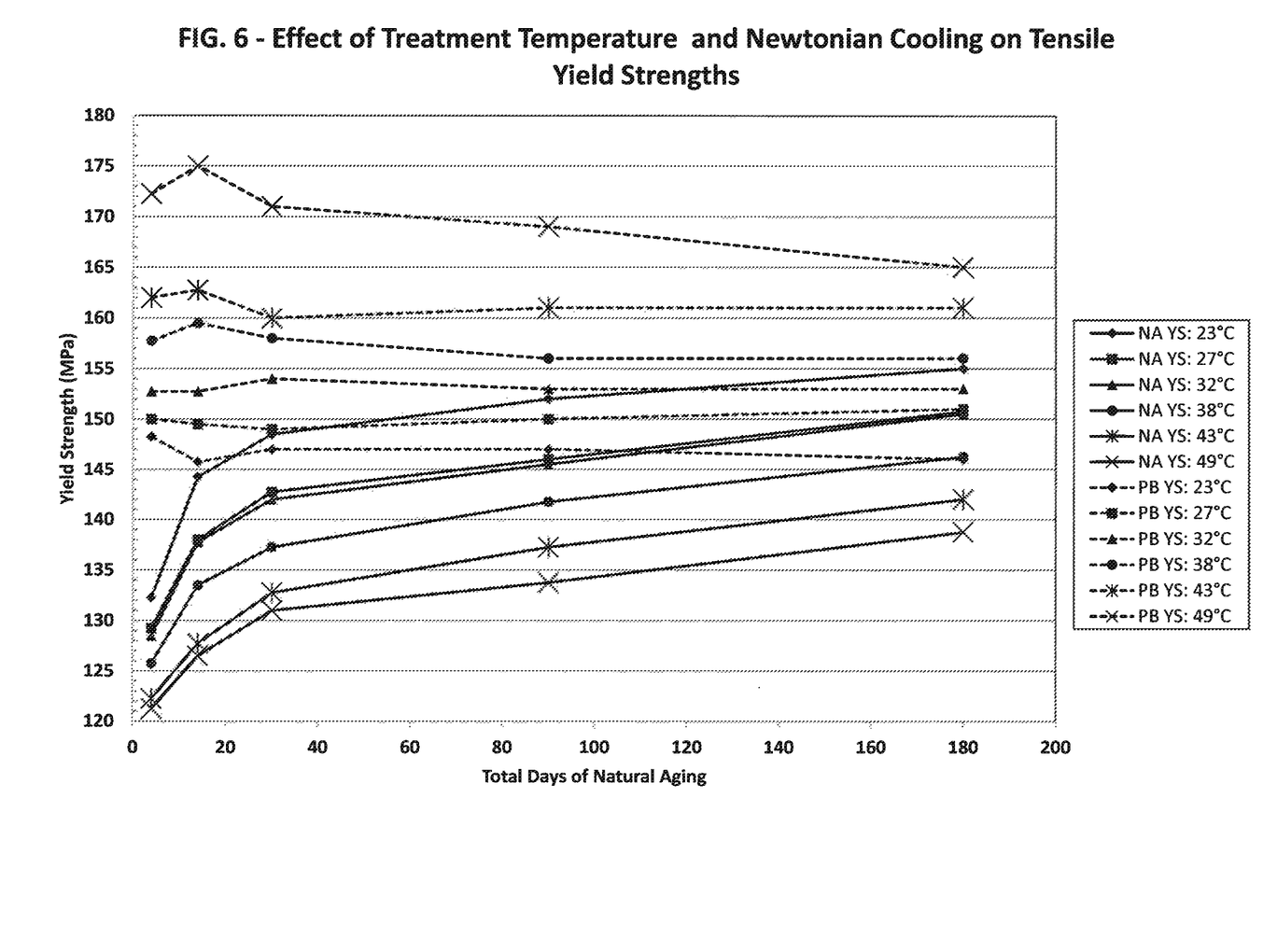
FIG. 6 is a graph illustrating the tensile yield strength properties as a function of post-quench time (heat treatment time plus subsequent natural aging time) for Example 2 alloys.

In addition to natural aging properties, mechanical properties were also measured after a simulated paint bake cycle of 180° C. for 20 minutes, both with and without a 2% pre-stretch (the 2% pre-stretch is used to simulate the strain imposed during automotive stamping). Tables 6-7, below contain the measured data. FIG. 6 illustrates the effect of the post-quenching thermal treatments on the strength properties of the alloys. (The simulated paint bake alloys without a pre-stretch all realized an elongation of 26-28%., and the simulated paint bake alloys with a 2% pre-stretch all realized an elongation of 23-25%.

TABLE 6

Strengths of Newtonian cooled Example 2 samples after simulated paint bake

| Post-Quench Exposure (° C.) | Newtonian Cooling Time to 23° C. (hrs) | TYS/(UTS) Properties | | | | |
|---|---|---|---|---|---|---|
| | | 4 days PQ + 180° C./20 min. | 14 days PQ + 180° C./20 min. | 30 days PQ + 180° C./20 min. | 90 days PQ + 180° C./20 min. | 180 days PQ + 180° C./20 min. |
| Ambient (≈23° C.) | 48 | 148/(273) | 146/(273) | 147/(273) | 147/(274) | 146/(273) |
| 27 | 48 | 150/(276) | 150/(275) | 149/(274) | 150/(278) | 151/(278) |
| 32 | 48 | 153/(278) | 153/(277) | 154/(279) | 153/(280) | 153/(281) |
| 38 | 48 | 158/(281) | 160/(282) | 158/(283) | 156/(282) | 156/(281) |
| 43 | 48 | 162/(283) | 163/(284) | 160/(284) | 161/(285) | 160/(283) |
| 49 | 48 | 172/(290) | 175/(292) | 171/(291) | 169/(289) | 165/(285) |

TABLE 7

Tensile yield strengths of Newtonian cooled Example 2 samples after 2% stretch and a simulated paint bake

| Post-Quench Exposure (° C.) | Newtonian Cooling Time to 23° C. (hrs) | TYS/(UTS) Properties | | | |
|---|---|---|---|---|---|
| | | 4 days PQ + 2% stretch + 180° C./20 min. | 14 days PQ + 2% stretch + 180° C./20 min. | 30 days PQ + 2% stretch + 180° C./20 min. | 90 days PQ + 2% stretch + 180° C./20 min. |
| Ambient (≈23° C.) | 48 | 190/(280) | 194/(284) | 193/(285) | 194/(286) |
| 27 | 48 | 198/(287) | 199/(289) | 198/(289) | 202/(291) |
| 32 | 48 | 200/(289) | 202/(292) | 200/(291) | 203/(292) |
| 38 | 48 | 203/(292) | 207/(296) | 204/(294) | 209/(296) |
| 43 | 48 | 208/(295) | 211/(297) | 207/(295) | 209/(296) |
| 49 | 48 | 218/(301) | 219/(302) | 213/(300) | 212/(299) |

As shown above and in FIG. 6, heating the samples by from 5° to 26° C. above ambient, post-quench, and allowing these alloys to slow cool following Newtonian cooling rates of a large coil results in more consistent performance by the alloy. For instance, the control sample left at ambient (about 23° C.) realized a significant increase in natural aging strength from 4 to 30 days (PQ), but a decrease in simulated paint bake strength. The large increase in natural aging strength would be expected to impact the consistency in subsequent forming operations (e.g., stamping) since yield strength changes may affect metal spring-back and may ultimately require re-tuning (e.g., machining) of stamping dies. While an increase in naturally aged strength may be detrimental to consistent stamping performance, a decrease in post-paint bake strength is also detrimental. The samples brought to temperatures from 32° C. to 49° C. and allowed to slowly cool following Newtonian cooling rates of a large coil all realized higher and more consistent simulated paint bake responses as compared to the 23° C. and 27° C. samples. Further, the samples aged at from 32° C. to 43° C. would be expected to achieve a TYS of at least 145 MPa, if leveled, as would occur during conventional coiling.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:
1. A method comprising:
   (a) preparing a 6xxx aluminum alloy sheet product for solution heat treatment;
   (b) after the preparing step, solution heat treating and then quenching the 6xxx aluminum alloy sheet product, wherein, after the quenching, the 6xxx aluminum alloy sheet product is at ambient temperature;
   (c) determining a temperature of a storage location for the 6xxx aluminum alloy sheet product;
   (d) based on the temperature of the storage location, selecting a post-quench treatment temperature, wherein the post-quench treatment temperature is in the range of from 30° C. to 60° C.;

(e) after the solution heat treating and quenching step, exposing the 6xxx aluminum alloy sheet product to the selected post-quench treatment temperature of from 30° C. to 60° C. for 0.2 to 300 seconds, wherein the exposing step comprises heating the 6xxx aluminum alloy sheet product to the selected post-quench treatment temperature;

(f) after the exposing step, coiling the 6xxx aluminum alloy sheet product into a coiled 6xxx aluminum alloy sheet product;

(g) after the coiling step, moving the coiled 6xxx aluminum alloy sheet product to the storage location.

2. The method of claim 1, wherein the 6xxx aluminum alloy is AA6111.

3. The method of claim 2, wherein the 6xxx aluminum alloy sheet product realizes a tensile yield strength of at least 145 MPa thirty days post-quench.

4. The method of claim 1, wherein the exposing comprises heating the 6xxx aluminum alloy sheet product via an infrared or induction heating apparatus.

5. The method of claim 4, wherein the residence time of the 6xxx aluminum alloy in the infrared or induction heating apparatus is from 0.2 to 5 seconds.

6. The method of claim 5, wherein the selected post-quench treatment temperature is from 30° C. to 55° C.

7. The method of claim 6, wherein the selected post-quench treatment temperature is from 30° C. to 50° C.

8. The method of claim 5, wherein the selected post-quench treatment temperature is from 30° C. to below 50° C.

9. The method of claim 5, wherein the selected post-quench treatment temperature is from 30° C. to 45° C.

10. The method of claim 4, wherein the residence time of the 6xxx aluminum alloy in the infrared or induction heating apparatus is from 0.2 to 4 seconds.

11. The method of claim 4, wherein the residence time of the 6xxx aluminum alloy in the infrared or induction heating apparatus is from 0.2 to 3 seconds.

12. The method of claim 4, wherein the residence time of the 6xxx aluminum alloy in the infrared or induction heating apparatus is from 0.2 to 2 seconds.

13. The method of claim 4, wherein the heating occurs continuously and in-line with at least the preparing step (a) and the solution heat treating and then quenching step (b).

14. The method of claim 1, wherein the 6xxx aluminum alloy is AA6022, AA6016, AA6014, or AA6013.

15. The method of claim 1, wherein the 6xxx aluminum alloy sheet product is non-isothermally heated during the exposing step (e).

16. A method comprising:
(a) preparing a 6xxx aluminum alloy sheet product for solution heat treatment;
(b) after the preparing step, solution heat treating and then quenching the 6xxx aluminum alloy sheet product, wherein, after the quenching, the 6xxx aluminum alloy sheet product is at ambient temperature;
(c) after the solution heat treating and quenching step, exposing the 6xxx aluminum alloy sheet product to a treatment temperature of from 30° C. to 45° C. for 0.2 to 5 seconds, wherein the exposing step comprises heating the 6xxx aluminum alloy sheet product to the treatment temperature;
(d) after the exposing step, and without further thermal treatment, coiling the 6xxx aluminum alloy sheet product into a coiled 6xxx aluminum alloy sheet product.

17. The method of claim 16, wherein the 6xxx aluminum alloy sheet product realizes a tensile yield strength of at least 145 MPa thirty days post-quench.

18. The method of claim 17, wherein the 6xxx aluminum alloy sheet product is an AA6111 aluminum alloy sheet product.

* * * * *